United States Patent Office 2,734,787
Patented Feb. 14, 1956

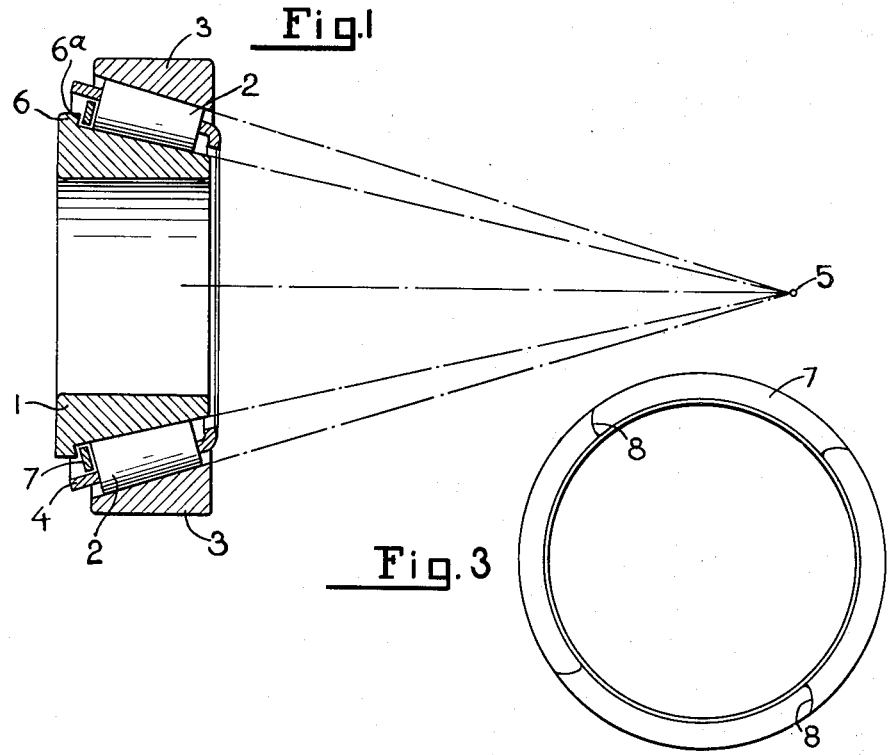
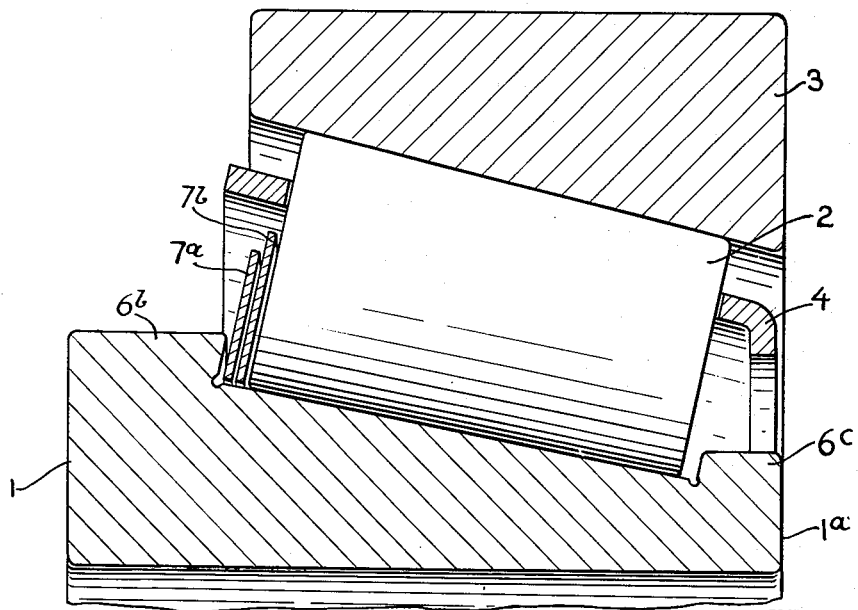

2,734,787

ROLLER BEARINGS

Francis J. L. Dorl, Summit, N. J.

Application April 22, 1953, Serial No. 350,328

4 Claims. (Cl. 308—214)

This invention relates to roller bearings of the type illustrated, for example, in United States Patent No. 1,937,733.

Roller bearings, and particularly tapered roller bearings, are subjected to both radial loads and thrust loads and often fail because of ununiform impact of thrust loads thereon.

Tapered roller bearings and the rollers thereof are constructed as frustums of cones in which the apex of the cones falls in the center of the shaft of rotation of the assembled tapered roller bearing. The bearings are usually constituted of three main parts, namely the cone which is normally provided with a thrust flange and constitutes the inner race for the rollers, the conical rollers, and the cup or outer bearing member. Usually a cage is provided between the cone and the cup to space the rollers and hold them in properly spaced position.

The cone, which is normally provided with a thrust flange at its outer end, may also be provided with a retaining rib at its inner end. The thrust flange usually bears directly against the base of the rollers and during rotary movement there is a constant friction between the base of the rollers and the thrust flange.

In the event of a side thrust on the bearings, the thrust flange moves toward the base of the rollers and the force of the thrust is transmitted to the base of the rollers. Under many service conditions these thrust loads are sudden and severe and much friction is produced between the thrust flange and the rollers which, due to the simultaneous rotation of the cone and the rollers, may cause rocking of the rollers, throwing them out of alignment and causing unusual wear or breakage of the bearing. Under other conditions, these service thrusts may not be uniform and may not be transmitted uniformly to the base of the rollers, but may be absorbed mainly on those rollers which are more directly in the path of the thrust; for example, if the thrust occurs toward the top of the bearing, the tendency is to transmit the major portion of the thrust to the base of the rollers at the top of the bearing, while the pressure of the thrust flange on the rollers at the bottom of the bearing may be temporarily reduced.

It is one of the objects of this invention to provide a tapered roller bearing in which friction between the thrust flange of the cone and the base of the rollers during normal operation of the bearing is materially reduced.

Another object of the invention is to provide a roller bearing in which a broad contact surface is provided between the rollers and the thrust flange and in which a more even distribution of side thrusts over all the rollers is provided than with prior roller bearings.

Another object of the invention is to provide a roller bearing with one or more floating, friction-reducing and shock-dispersing rings between the thrust flange of the cone and the base of the rollers, whereby friction between the thrust flange and the base of the rollers is reduced and whereby wear between these parts can be compensated for by disassembling the bearing and replacing the worn anti-friction rings with thicker rings or with a plurality of such rings.

Various other objects and advantages of my invention will appear as this description proceeds.

Referring now to the drawings, which are intended to be illustrative of a typical form of tapered roller bearing, Fig. 1 is a cross-section through such a bearing showing also the common axis of the cone, cup and rollers.

Fig. 2 is a sectional view through the upper portion of a similar bearing showing the use of two anti-friction rings between the thrust flange of the cone and the base of the rollers.

Fig. 3 is a plan view of one of the anti-friction rings.

In the embodiment illustrated in Fig. 1, the cone of the bearing is indicated at 1, the rollers are indicated at 2, the cup or outer bearing member at 3, and the cage for the rollers at 4. All of these parts are of normal construction used in tapered roller bearings in common use. The common apex of the cone, cup and rollers is indicated at 5.

The inner race or cone 1 carries a thrust flange 6 which, in the ordinary roller bearing, bears directly on the base of the rollers 2, but in my bearings, bears on the free-floating anti-friction ring 7 which anti-friction ring in turn bears against the base of the rollers 2. Inasmuch as the base of the rollers 2 must be at right angles to the axis of the rollers, in order to bear uniformly on the rollers, the ring 7 is given a frustro-conical shape at the circumference as indicated in Fig. 1, and the flange 6 has its friction face 6a machined so as to lie at right angles with the axis of the rollers 2 or parallel to the base of the rollers.

While I have illustrated the use of a cage 4 in the embodiment of the roller bearing shown in Fig. 1, it will be understood that the cage may be omitted without departing from the principles of my invention.

In the operation of the bearing illustrated in Fig. 1, the ring 7, which floats freely between the thrust flange 6 and the base of the rollers 2, is provided with a layer of lubricant, such as oil or grease, on both sides so that friction between the ring 7 and the friction face 6a of the thrust flange 6 and between the ring 7 and the base of the rollers 2 is reduced by virtue of the free-floating mounting of the ring 7 in the cone 1 and by virtue of the two fluid friction films provided by the lubricant between the ring 7 and the thrust flange 6 and the rollers 2.

The ring 7 may also be provided with oil grooves 8 which may be in any desired contour to facilitate feeding of the lubricant from the inner to the outer circumferences of the ring 7 or vice versa.

The ring 7 may be made of any desired load-bearing material of sufficient tensile and compressive strength to meet the service requirements of the bearing. It is preferably, but not necessarily, a metal ring and may be made of the same composition as the composition of the cone 1 and rollers 2, which are normally of hardened steel. The ring 7, however, may be made of phosphorus bronze, copper bearing alloys, chromium plated steel, or the like, and may be of the same hardness as the flange 6 and rollers 2 or may be harder or softer than these parts of the bearing.

The fact that the ring 7 may be of different material than the thrust flange and rollers can also be of great advantage for the reducing of friction. It is well known that a material which rubs against a like material produces greater friction and will heat up and seize more quickly than if one material rubs against a dissimilar material. In other words, steel rubbing against steel produces much more friction and heat than steel rubbing against bronze or copper. In the prevailing roller bearings the thrust flange is of hardened steel and the rollers are of hardened steel, which, as contact surfaces, are excellent friction creators. Therefore the interposition of a floating load-dispersing ring of a different material is of great benefit in reducing friction and heating. The presence of the ring also tends to dissipate heat, thereby tending to cause the bearing to run cooler and tending to preserve the viscosity of the lubricant.

In addition to its function in reducing friction between the thrust flange 6 and the rollers 2, the ring 7 also serves to transmit thrust loads more uniformly from the cone 1 to the rollers 2. When a side thrust occurs, for example, in the direction of the apex 5 of the bearing, the side thrust may be uniform around the whole of the bearing or it may be concentrated on only a portion of the bearing. If the side thrust occurs toward the top of the bearing, as illustrated in Fig. 1, with an ordinary bearing the thrust would normally be transmitted to only a few of the rollers at the top of the bearing and, therefore, a higher thrust load would be borne by these few rollers than if the thrust load were distributed more uniformly over a larger number of the rollers.

In the construction of the bearing illustrated in Fig. 1, a thrust load occurring toward the top portion of the bearing will first be transmitted to the ring 7 and the ring 7, being essentially a free-floating rigid member, will in turn be forced toward the base of the rollers substantially around its entire circumference, and while the main impact of the thrust described will still be toward the top of the bearing, it will be distributed more uniformly over all of the rollers than if the ring 7 were not present.

In the ordinary roller bearing when the parts become worn and any material amount of looseness or play develops between the cone, the rollers and the cup, it is necessary to remove and replace the entire bearing. In the bearing illustrated in Fig. 1, wear between the base of the rollers and the thrust flange 6, as well as between the rollers and the cone 1 and cup 3, can be to a large extent taken up and compensated for by disassembling the bearing and replacing the ring 7 with a thicker ring sufficient to compensate for the wear between the parts, or by the insertion of a plurality of free-floating rings instead of the single ring 7 as illustrated in Fig. 1.

In the embodiment of the invention illustrated in Fig. 2, the cone 1a is shown as provided with an outer thrust flange 6b and in inner retaining rib 6c. The rollers 2 and the cup 3 are of essentially the same construction as illustrated in Fig. 1. A cage 4 is also shown but may be omitted, as stated above. In this embodiment of the invention two free-floating anti-friction rings 7a and 7b are shown, each of a dished or frustro-conical contour, so as to lie parallel with the base of the rollers 2. The use of two free-floating rings such as 7a and 7b permits the use of a lubricating film not only between the ring 7a and the thrust flange 6b, and between the ring 7b and the base of the rollers 2, but also between the two rings 7a and 7b.

The rings 7, 7a and 7b may be of any desired width and thickness and may extend to the center or axis of the rollers 2 or may extend beyond or be terminated short of the axis of the rollers 2. With the use of the rings 7, 7a or 7b, the outward extension or depth of the thrust flange 6 or 6a may be reduced.

With the improvement here described there is no direct contact between the thrust flange and the rollers. One or more free and thrust-dispersing rings have been inserted, and there has also been provided one or more additional layers of lubricant. These layers of lubricant are of importance, not only because of the extra slip between the contact surfaces, but also because of the speed reducing effect of these free-floating rings. In contradistinction to the cone and the thrust flange, which are positively rotated, these rings are free and float in oil. This means that they are merely pushed and carried along solely by the movement of the bearing parts and by the adhesive and cohesive characteristics of the lubricant used. The presence of the additional lubricant films also tends to cushion and absorb some of the thrust load forces.

While I have illustrated preferred forms of embodiment of my invention as applied to the type of tapered roller bearings normally used, it is to be understood that the invention is applicable to cylindrical roller bearings and to other forms of tapered roller bearings and that various modifications and changes may be made in the embodiments illustrated without departing from the spirit of my invention or the scope of the appended claims.

I claim:

1. In a taper roller bearing comprising an inner bearing cone, an outer bearing cup and a plurality of one-piece frustro-conical rollers having flat planar bases and a cage therebetween, a thrust flange on said inner bearing cone parallel with the base of said rollers and a free-floating annular ring parallel with the base of said rollers between said thrust flange and said rollers, the inner circumference of said ring bearing on said inner bearing cone.

2. In a taper roller bearing comprising an inner bearing cone, an outer bearing cup, a plurality of one-piece frustro-conical rollers having flat planar bases and a cage between said cone and said cup, a thrust flange on said inner bearing cone parallel with the base of said rollers, a free-floating flat annular ring parallel with the base of said rollers between said thrust flange and said rollers, a lubricant between said free-floating annular ring and said flange and rollers, and lubricant grooves in said ring.

3. In a taper roller bearing comprising an inner bearing cone, an outer bearing cup, a plurality of one-piece frustro-conical rollers having flat planar bases between said cone and said cup, a thrust flange on said inner bearing cone parallel with the base of said rollers, a plurality of free-floating annular rings parallel with the base of said rollers between said thrust flange and said rollers, and an annular cage between said cone and said cup, spacing the rollers apart.

4. In a roller bearing, a conical inner bearing race, a conical outer bearing race, a plurality of one-piece frustro-conical rollers and a cage therebetween, an integral thrust flange on one of said bearing races having a flat bearing surface at substantially right angles to the bearing surface of said bearing race and a free-floating, flat planar annular ring between said thrust flange and said rollers, the inner circumference of said ring bearing on said inner bearing race, the rear flat face of said ring bearing on said thrust flange and said rollers having flat planar bases bearing on the front flat face of said free-floating ring.

References Cited in the file of this patent

UNITED STATES PATENTS

| | | |
|---|---|---|
| 986,453 | Gillette | Mar. 14, 1911 |
| 1,072,667 | Smith | Sept. 9, 1913 |
| 1,212,253 | Perkins | Jan. 16, 1917 |
| 1,286,438 | Smith | Dec. 3, 1918 |

FOREIGN PATENTS

| | | |
|---|---|---|
| 474,143 | Great Britain | Oct. 26, 1937 |
| 77,887 | Sweden | Sept. 11, 1931 |